Patented Apr. 21, 1953

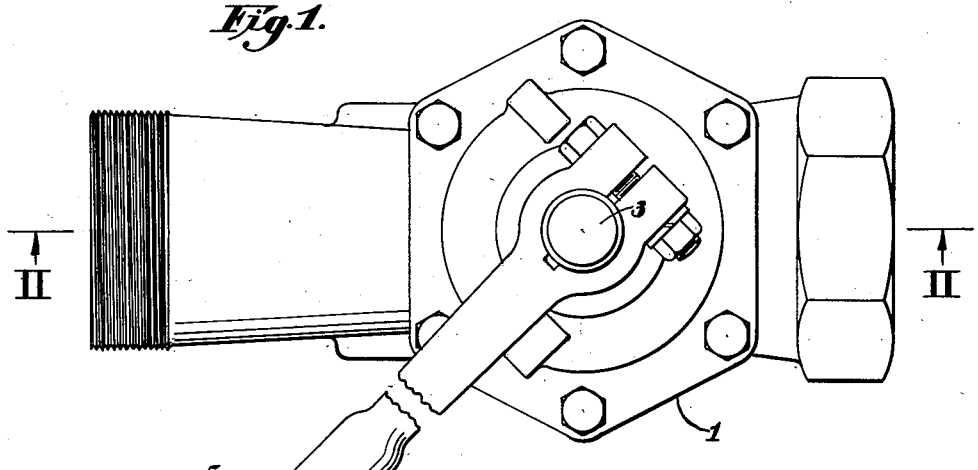
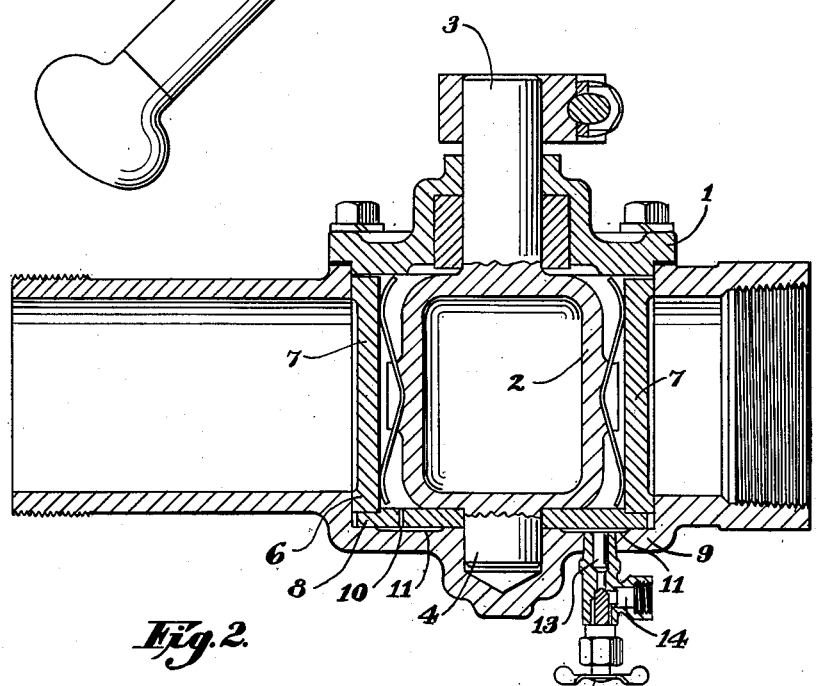

2,635,633

UNITED STATES PATENT OFFICE 2,635,633

GATE VALVE PRESSURE LOCK

Allan G. Sheppard, Elmira, N. Y., assignor to American-La France-Foamite Corporation, Elmira, N. Y., a corporation of New York Application November 15, 1946, Serial No. 710,048

1 Claim. (Cl. 137—608)

This invention relates to gate valves of the kind used, for example, to control water flow to fire hose lines supplied by a pump; and it has for its object a valve of this general character having effective provision for locking the flow control member of the valve at any desired degree of opening.

In valves of this type, utilizing a rotatable gate or flow control member located in the flow stream, the gate may readily hold its full open or full closed positions; but at intermediate settings, the pressure of the stream is sufficient to move the gate unless some form of lock is provided. According to the present invention, as described at length below with reference to a preferred embodiment, provision is made for utilizing the pressure of the water stream to lock the gate at any desired position and without interfering with the free action of the gate as it is adjusted from one position to another.

In the accompanying drawings, Fig. 1 is a top plan view of a valve of the kind referred to above and Fig. 2 is a section on the line II—II of Fig. 1, the valve incorporating an illustrative form of the invention.

The particular valve shown in the drawings is of a known type and need not be described in detail. As is well known and will be recognized, it includes a valve housing, generally designated 1, having a transverse flow passage controlled by a gate or flow control member 2. The latter is rotatable to open and close the flow passage, having upper and lower stub shafts 3 and 4 journaled in the housing walls, the shaft 3 carrying the valve control handle 5 at its upper end. The foregoing elements and the indicated spring-sustained shoes 6 and 7 form no part of the invention and may be of standard or any preferred construction.

According to the invention, a part of the flow control member, or of an element associated with it, is arranged to loosely abut a portion of the housing, the said part normally being subjected, on both sides, to the pressure of the water stream when the valve is open. In other words, the said part is normally balanced so far as the water pressure is concerned. And means is provided for relieving the pressure, at will, on the side of the said part abutting the housing, so that the full pressure of the water is thereupon applied to frictionally engage the abutting surfaces and thereby interlock them against relative movement. Whenever it is desired to adjust the setting of the valve it is only necessary to restore the pressure balance, whereupon the said part is again free to move relatively to the said housing portion.

In the preferred form illustrated, a disc 8 is utilized, the disc being arranged coaxially with the flow control member and adapted for rotation with it. As will be understood, the disc may be an integral part of the gate or may be secured to it or simply keyed to the stub shaft 4. The disc overlies the wall 9 of housing 1 and, of course, its upper surface is subject to the pressure of the water in the flow passage. Provision is made whereby the lower surface of the disc has restricted communication with the water flow passage, which may result from the normal free fit of the parts or may be assured, as by a small bleed opening 10. Preferably, too, that portion of the housing wall 9 which the disc overlies is recessed, as at 11, in which event the bleed opening 10 may lead directly to the recess. It will be recognized that by the foregoing means the disc is normally balanced against any tendency of the water pressure to effect limited axial movement of the disc as would bind it against the wall 9, so that the gate is freely rotatable by handle 5.

Means is provided for venting the water pressure applied to the lower face of the disc to cause the disc, under the continuing pressure applied to its upper face, to bind against the adjacent surface of wall 9 and thereby lock the gate against rotation. Such means is shown as consisting of a valve 12 controlling an outlet 13 from the recess 11. The outlet 13 is of large capacity compared to the bleed opening 10 and may discharge, through passage 14, to any point of substantially lower pressure than that within the valve housing, as to atmosphere or to the suction side of the supply pump if such is used.

From the foregoing it will be understood that the vent or relief valve 12 is normally closed, the gate being adjusted to its required setting, as usual, without any interference from the disc. When the gate is in the desired position, the vent valve is opened and the full water pressure thereupon applied to cause the disc to bind against the adjacent surface of the housing and lock the gate against rotation. This condition continues just so long as the vent valve remains open, but the gate is readily unlocked for readjustment simply by closing the vent valve and thereby restoring the pressure balance to the disc.

In the light of the foregoing description the following is claimed:

A valve comprising in combination with a water flow passage incorporating a valve housing having its axis normal to the flow path and including an end wall having an interior surface portion parallel to the flow path, and a flow control member journaled in said end wall for rotation in the valve housing; a coaxial disc element secured to the flow control member within the valve housing, with its upper surface exposed to the pressure within the housing and with its lower surface normally loosely abutting the said interior surface portion; said end wall having a recess underlying a limited portion of said disc element and the latter having a bleed opening therethrough providing restricted communication between the interior of the housing and said recess; and a valve for venting said recess.

ALLAN G. SHEPPARD.

References Cited in the file of this patent

UNITED STATES PATENTS

| Number | Name | Date |
| --- | --- | --- |
| 919,753 | Ord | Apr. 27, 1909 |
| 1,086,221 | Reynolds | Feb. 3, 1914 |
| 2,287,333 | Walker | June 23, 1942 |
| 2,299,517 | Volpin | Oct. 20, 1942 |

FOREIGN PATENTS

| Number | Country | Date |
| --- | --- | --- |
| 540,067 | Great Britain | Oct. 3, 1941 |